United States Patent [19]

Kontz

[11] Patent Number: 4,645,480
[45] Date of Patent: Feb. 24, 1987

[54] METHOD AND APPARATUS FOR FABRICATING NESTABLE THERMOPLASTIC CONTAINERS

[75] Inventor: Robert F. Kontz, Toledo, Ohio
[73] Assignee: Owens-Illinois, Inc., Toledo, Ohio
[21] Appl. No.: 772,085
[22] Filed: Sep. 3, 1985
[51] Int. Cl.$^4$ .............................................. B31B 1/90
[52] U.S. Cl. .................................... 493/106; 493/107; 493/112; 493/134
[58] Field of Search ............... 493/106, 107, 112, 134

[56] References Cited

U.S. PATENT DOCUMENTS

| | | | |
|---|---|---|---|
| 3,289,552 | 12/1966 | Corazzo | 493/107 |
| 3,854,583 | 12/1974 | Amberg et al. | 229/48 T |
| 4,053,346 | 10/1977 | Amberg et al. | 493/107 |
| 4,072,549 | 2/1978 | Amberg et al. | 493/74 |

*Primary Examiner*—Frederick R. Schmidt
*Assistant Examiner*—Robert Showalter
*Attorney, Agent, or Firm*—John R. Nelson

[57] ABSTRACT

Sleeve fabricating apparatus for fabricating cylindrical sleeves from rectangular blanks of a heat-shrinkable thermoplastic material and for transferring the sleeves, in succession, to frustoconical mandrels of a cup-forming machine. The sleeve-fabricating apparatus has a plurality of cylindrical mandrels that are rotatably affixed to a rotary turret. The sleeves are fabricated from rectangular blanks that are cut, in succession, from a web of indefinite length as the web is being unwound from a coil at an unwind stand. Each blank is longer than the circumference of the cylindrical mandrel to which it is applied, leaving ends of the blank which overlap, and the overlapped ends are joined to one another by heat-sealing. Cups are formed by the cup-forming machine, each cup being formed from one of such sleeves and a disc. The sleeve fabricating apparatus also includes a disc forming mechanism for forming discs and applying the discs, in succession, to the cylindrical mandrels. The rotary turret rotates the cylindrical mandrels, in succession, past a transfer station, where a cylindrical mandrel is approximately aligned with a frustoconical mandrel of the cup-forming machine over a finite, approximately straight lineal path, and a sleeve and a disc are transferred in unison by a transfer mechanism from a cylindrical mandrel of the sleeve fabricating apparatus to a frustoconical mandrel of the cup-forming machine, the sleeve transferred over the small end of the frustoconical mandrel to permit the transfer to take place over a finite period of time.

34 Claims, 10 Drawing Figures

METHOD AND APPARATUS FOR FABRICATING NESTABLE THERMOPLASTIC CONTAINERS

BACKGROUND OF THE INVENTION

1. FIELD OF INVENTION

This invention relates to a method and apparatus for fabricating thermoplastic containers, and particularly thermoplastic containers which are nestable in configuration and whose bodies are formed from rectagular blanks of a semi-rigid, heat-shrinkable thermoplastic material by heat-shrinking.

2. DESCRIPTION OF THE PRIOR ART

U.S. Pat. No. 4,072,549 (Amberg, et al), which is assigned to the assignee of this application, relates to a method and apparatus for forming nestable thermoplastic containers, such as drinking cups. Each nestable container which is formed by the method and apparatus of the Amberg et al patent has a body which is formed from a rectangular blank of a semi-rigid, heat-shrinkable material. According to the techniques of the aforesaid Amberg et al patent, cylindrical sleeves are formed from a web of a thermoplastic material at a first station, in an operation in which the web is cut into rectangular blanks before the blanks, in succession, are fabricated into the cylindrical sleeves. The sleeves are then transferred in succession to a second station, which is a rotary turrent that carries a multiplicity of individual forming mandrels. Each forming mandrel is in the shape of the frustoconical cup that is to be formed thereon, with the bottom end of the cup being the top end of the mandrel on the rotary turret of the cup making machine. As the cup forming mandrel turret rotates, the cylindrical sleeves on the madrels thereof are gradually and successively manufactured into cups in a series of operations that includes the feeding of a circular bottom closure disc onto the top of the mandrel, the heating of the cylindrical sleeve to cause it to shrink to conform to the shape of the mandrel and to seal an inturned marginal portion of the sleeve to the bottom closure disc to form a sealed bottom for the cup, and the forming of a rim on the outside of the top end of the cup, which is the bottom end of the cylindrical sleeve in its orientation in the various stations of the rotary turret of the cup-making machine.

Cups of other nestable containers that are produced by means of a cup-making machine of the type described in the aforesaid Amberg, et al patents are generally described in U.S. Pat. No. 3,854,583 to Amberg, et al., which is also assigned to the assignee of this application, and such cups are preferably of a two-piece configuration, in which the cup bottom is formed from a disc-shaped piece of a thermoplastic material that is heat-sealable to an inturned marginal portion of the heat-shrunken cylindrical sleeve to form a bottom seam. However, according to the aforesaid U.S. Pat. No. 3,854,583, the cups may also be formed with an integral bottom from a single piece of a heat-shrinkable material, viz., the rectangular blank that is used to form the container sidewall, by utilizing a blank with a vertical dimension that substantially exceeds the vertical height of the container sidewall, and by heat shrinking and fabricating the excess height of the rectangular blank into the integral bottom of the container, as is taught in the aforesaid U.S. Pat. No. 3,854,583.

In the production of cups or other nestable containers by means of a cup-making machine of the type described in the aforesaid U.S. Pat. No. 4,072,549, it has been found that the productivity of the machine is limited by the rate at which cylindrical sleeves can be formed in the sleeve fabrication device employed at the first station of the machine, since the sleeve fabrication device uses a single winding member for the winding or wrapping of all the cylindrical sleeves for the various forming mandrels on the associated rotary turret of the machine. Inherently, it was found that sleeves could not be fabricated as fast as they could be processed into nestable cups in the subsequent operations of the cup-making machine and, therefore, the output of the machine was found to be less than that which the machine was otherwise capable of producing.

Another productivity-limiting feature of the machine of the aforesaid U.S. Pat. No. 4,072,549, when used to produce two-piece cups, is that the cup bottom pieces are transferred to the cup mandrels after the mandrels have been indexed from the station where the cylindrical sleeves for the cup bodies are applied thereto. No work can be done on the cylindrical sleeves to transform them into cup bodies until after they have been properly positioned with respect to the bottom pieces that they are to be assembled to, and the portion of the cup forming machine that is located between the sleeve transfer station and the bottom disc transfer station is essentially out of production.

SUMMARY OF INVENTION

According to the present invention there is provided an improved device for fabricating cylindrical sleeves from rectangular blanks of a semi-rigid material, such as an expanded polymeric material, and when such semi-rigid material is a heat-shrinkable polymeric material such improved device has utility as a sleeve forming station in a cup-making machine that is otherwise similar to that disclosed in the aforesaid U.S. Pat. No. 4,072,549 (Amberg, et al.). A sleeve fabricating device according to the present invention utilizes a rotary turret that carries an array of cylindrical sleeve forming mandrels around its outer periphery, spaced apart from one another and equidistant from the central axis of the rotary sleeve forming turret, the axis of rotation of such rotary turret. Each of the sleeve forming mandrels is rotatable about its central axis, which is parallel to the central axis of the rotary turret. The rotation of the rotary turret is effective in presenting the sleeve forming mandrels, in succession, at a winding station, where a rectangular blank is provided from a web of indefinite length of the blank material that is in coiled form at an unwind stand, near the winding station. The coiled blank material is gradually uncoiled, and the uncoiled portion is first passed into contact with a portion of the outer surface of a rotating transfer drum that rotates in substantial tangential relationship with the sleeve forming mandrel at the winding station, with a gap or nip between the transfer drum and the winding mandrel that is approximately equal to the thickness of the web of blank material that is being uncoiled. A rotating knife roll is provided between the unwind stand and the transfer drum in substantial tangential relationship with the transfer drum, and the uncoiling web is fed to the transfer drum in the nip between the knife roll and the transfer drum. A knife blade is provided at one location on the outside of the knife roll to cut the unwinding web that is being passed through the nip between the knife roll and the transfer drum into blanks of the proper length, as measured by the lineal travel of the web from the unwind stand.

The blank that is wound around the winding mandrel at the winding station is of such a lineal dimension, with respect to the circumference of the winding mandrel, that its leading and trailing edges overlap, and it is maintained in this position by an arcuate guide that extends between the winding station and a seam sealing station to tangentially contact the wound blanks on the winding mandrel as the winding mandrels are advanced in succession from the winding station to the seam sealing station by the rotation of the rotary sleeve forming turret. A seam sealing device is provided at the seam sealing station to seal the overlapping leading and trailing edges of the wound blank to one another in a lapped seam. Preferably, the seam sealing device is a heat sealing device, and a hot air heat sealing device is preferred for expanded polystyrene and other popular types of expanded thermoplastic materials that are used in the manufacture of nestable drinking cups and other types of nestable containers.

After the seam-sealed, wound, rectangular blanks, now in the form of cylindrical sleeves, pass from the seam-sealing station, they are rotated in succession by the rotation of the rotary sleeve forming turret to a bottom disc transfer station. At the bottom disc transfer station circular bottom discs of a material that is sealable to the cylindrical sleeves, preferably by heat sealing, are punched from a web of indefinite length of such bottom disc material, an unwind stand for unwinding such web from a coil of such material being positioned near such bottom disc transfer station. The circular bottom discs are applied, in succession, to the bottoms of the cylindrical sleeve winding mandrels, and the cylindrical sleeve winding mandrels are provided with a source of vacuum to retain each bottom disc thereon until it is desired to transfer such bottom disc to a cup-forming mandrel on the cup-making machine.

The rotary turret that carries the cylindrical sleeve forming mandrels rotates in a plane that is parallel to and above the plane of rotation of the rotary turret that carries the inverted cup-forming mandrels, and the rotary sleeve-forming mandrel turret rotates in overlapping counterrotating relationship with the rotary cup-forming mandrel turret. A transfer station for transferring a cylindrical sleeve and a bottom disc to a cup forming mandrel is located at a position where a sleeve-forming mandrel is approximately axially aligned, and vertically above, a cup-forming mandrel. The large end of each cup-forming mandrel is approximately equal in diameter to the diameter of each of the sleeve-winding mandrels and, therefore, the small end of each cup-making mandrel, the end which is adjacent the sleeve-winding mandrel at the transfer station, is substantially smaller in diameter than the diameter of the sleeve-winding mandrel and the inside diameter of the sleeve that is being transferred from such sleeeve-winding mandrel at the transfer station. This dimensional relationship between the inside diameter of the sleeve and the diameter of the small end of the cup-forming mandrel to which the sleeve is being transferred provides for substantial clearance therebetween, and this clearance permits the transfer to take place by means of a transfer mechanism over a finite period of time rather than only at the precise instant when the axis of the sleeve winding mandrel is most nearly axially aligned with the axis of the cup-forming mandrel at the transfer station. Such finite time period is sufficient to permit the transfer of a cylindrical sleeve, together with a bottom disc, to a cup-forming mandrel within the time it takes the cup-making machine to produce a cup, and without requiring any of the elements of the transfer mechanism to move too quickly or to accelerate or decelerate too rapidly. Thus, by virtue of the increase in the capacity of the machine to form cylindrical sleeves, due to the fact that individual sleeves are being wound in overlapping winding cycles on a multiplicity of winding mandrels and the fact that each sleeve can be transferred from a winding mandrel to a cup-forming mandrel over a finite period of time, sleeves can be produced and transferred to the cup-forming mandrels at a rate which is equal to the rate at which cups can be produced by the cup-forming mandrels, and the productivity of the cup-making machine need no longer be limited by the productivity of the sleeve-winding and transfer elements of the machine. Additionally, by virtue of the fact that a cylindrical sleeve and a bottom disc are transferred to a cup-forming mandrel at the same time, the cup-forming operation can begin immediately after the sleeve transferring operation, and the productivity of the cup-forming machine can also be increased in this manner.

Accordingly, it is an object of the present invention to provide an improved method and apparatus for fabricating cylindrical sleeves from retangular blanks of a semi-rigid material.

It is a further object of the present invention to provide a method and apparatus for successively forming cups or other nestable containers from fabricated cylindrical sleeves in which the sleeves are successively fabricated in overlapping cycles by an apparatus that is separate from the container-forming apparatus.

It is a further object of the present invention to provide a method and apparatus for successively forming nestable containers from fabricated cylindrical sleeves and bottom discs in which the sleeves and bottom discs are fabricated by an apparatus that is separate from the container-forming apparatus and in which the sleeves and discs are successively transferred in sets to the container-forming apparatus at a common transfer station, each such set including one sleeve and one disc.

For a further understanding of the present invention and the objects thereof, attention is directed to the drawing and the following brief description thereof, to the detailed description of the invention and to the appended claims.

DETAILED DESCRIPTION OF THE PREFERRED EMBODIMENT

The apparatus of the present invention may be considered to be made up of a plurality of separate working stations, or subassemblies, which will hereafter be described individually and in relationship to one another. These subassemblies include a rotar cup-forming machine, indicated generally at 100, a rotary sleeve-forming machine, indicaated generally at 200, a sleeve black processing apparatus, indicated generally at 300, a bottom disc processing apparatus, indicated generally at 400 and a drive train, indicated generally at 500 in FIG. 3.

Except as is hereafter described, the rotary cup-forming machine 100 is the same as the rotary cup-forming machine described in the aforesaid U.S. Pat. No. 4,072,549 (Amberg, et al), and the disclosure of such U.S. Pat. No. 4,072,549 is hereby incoporated herein by reference. Nestable two-piece containers are formed in succession by such a machine, from generally cylindrically shaped fabricated sleeves of a heat-shrinkable thermoplastic material, such as biaxially oriented polystyrene, indicated by reference character S in the drawing, and from circular bottom discs of a material which is sealable to the sleeves S, such discs being indentified by reference character D in FIG. 2 of the drawing. Most conveniently, the discs D are formed from a material which is generally the same as the material used in the fabrication of the sleeves S, in which case a disc D and the sleeve S may be sealed to one another by heat-sealing, all as is explained in the aforesaid U.S. Pat. No. 4,072,549.

Figure 2:
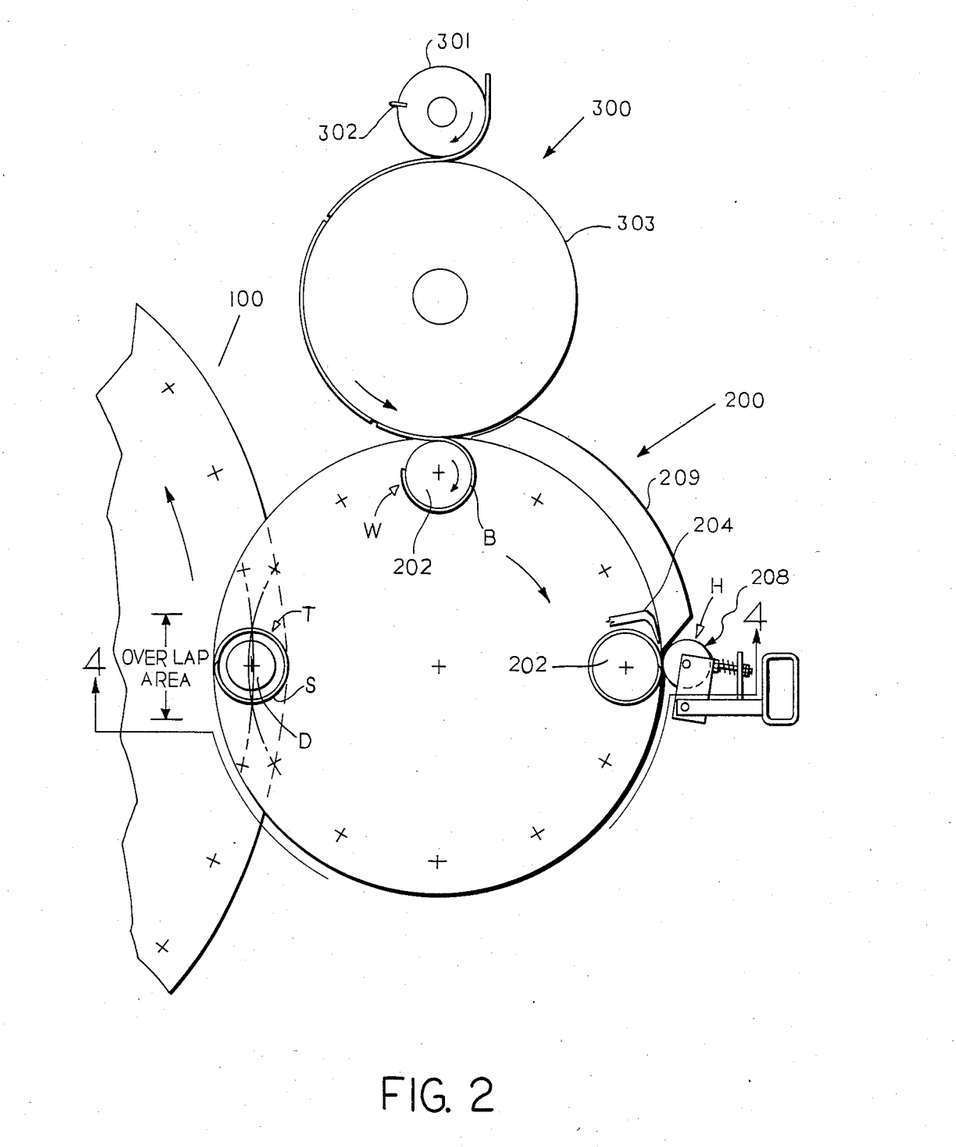
FIG. 2 is a schematic plan view of a portion of the apparatus shown in FIG. 1.
Figure 3:
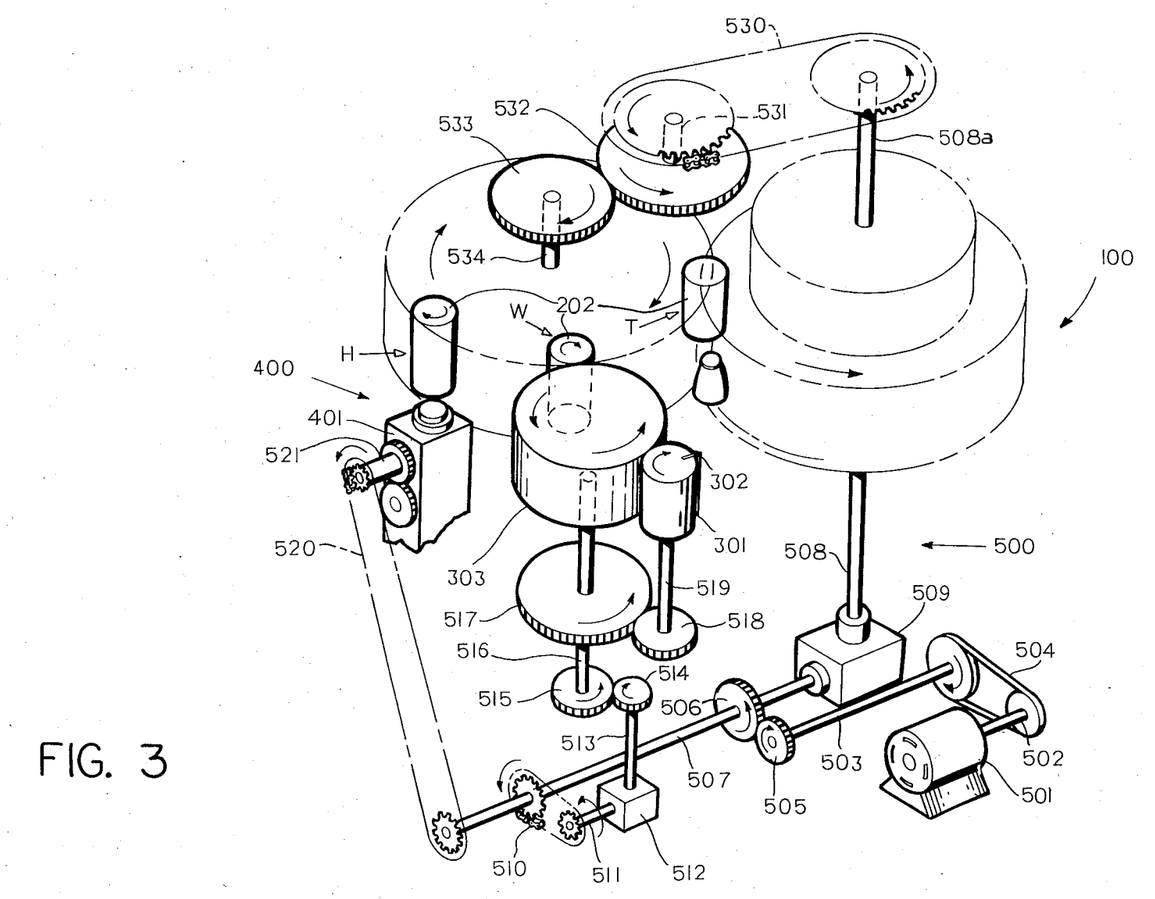
FIG. 3 is an exploded schematic view illustrating a drive train for driving the various drive mechanisms of the apparatus shown in FIGS. 1 and 2.
Figure 4:
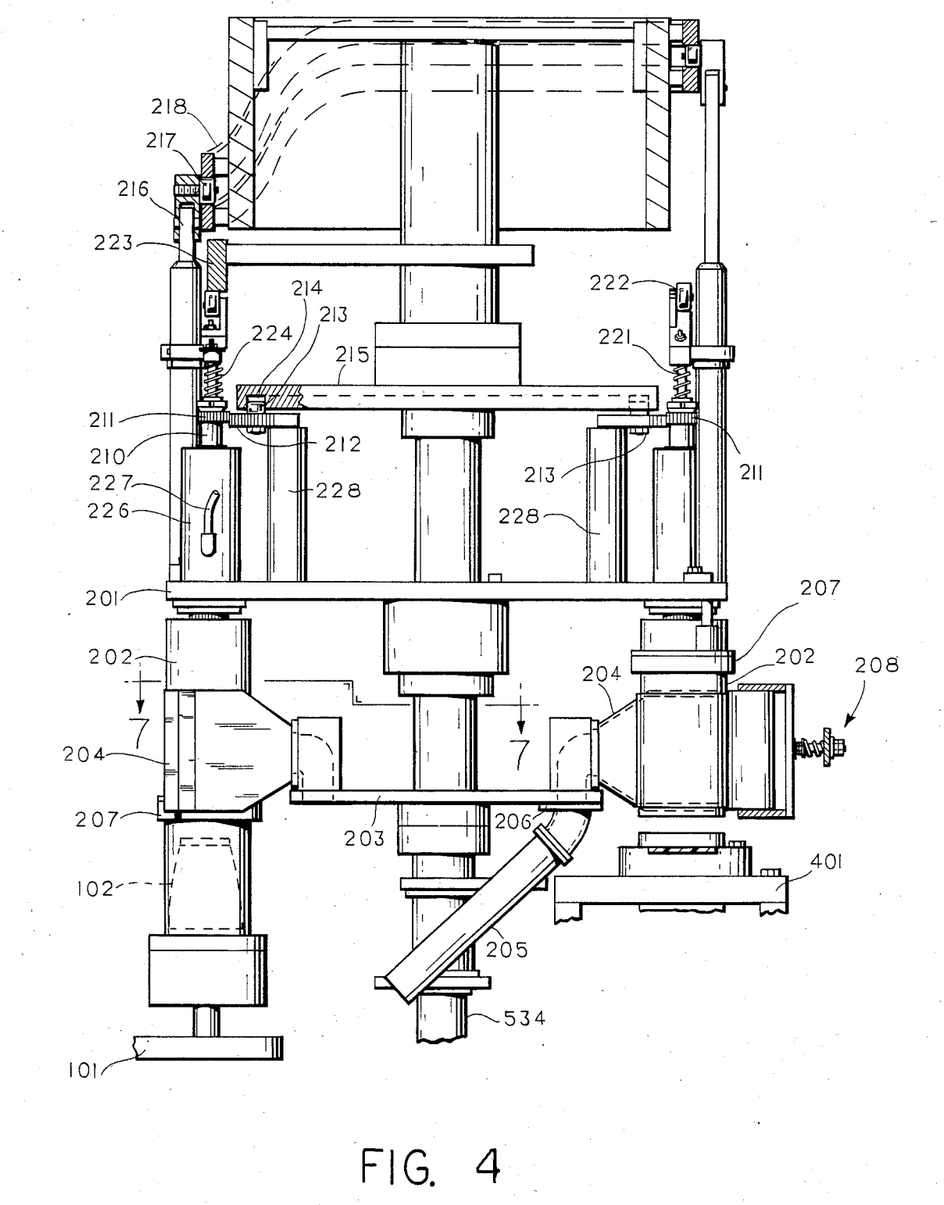
FIG. 4 is a sectional view taken on line 4—4 of FIG. 2, with certain of the structure of FIG. 1 being omitted from FIG. 4 for the sake of clarity.

The rotary cup-forming machine 100 includes a turret 101, shown in FIG. 4, which is rotatble in a horizontal plane by means of the drive mechanism illustrated in FIG. 3, as will be hereafter described more fully. The rotary turret 101 includes a multiplicity of upwardly-facing cup-shaped cup-forming mandrels 102 which are positioned on the rotary turret 101 in an evenly spaced circular array around the outer periphery thereof, and equidistant from the vertical central axis of rotation thereof. The rotation of the rotary turret 101 successively moves each of the cup-forming mandrels 102 in an endless path through a multiplicity of stations, the first of which is a transfer station, indicated generally by reference character T in FIG. 2, where a sleeve blank is transferred from the rotary sleeve-forming machine 200 to the cup-forming mandrel 102 at the transfer station T. Preferably, a bottom disc is also transferred to the cup-forming mandrel 102 at the transfer station T when the sleeve S is transferred to such cup-forming mandrel 102, so that the subsequent steps in the production of a cup from such sleeve S and disc D can begin as soon as the cup-forming mandrel 102 leaves the transfer station T. The rotary sleeve forming machine 200 includes a rotary 201 (FIG. 4) that rotates in a horizontal plane of rotation above the plane of rotation of the turret 101 of the cup-forming machine 100 and in the opposite direction. The rotary turret 201 of the rotary sleeve forming machine 200 carries a multiplicity of cylindrical sleeve forming mandrels 202, each of which is rotatable about its vertically extending central axis. The sleeve forming mandrels 202 are spaced apart from one another around the periphery of the turret 201, extending downwardly therefrom as is shown in FIG. 4, and the sleeve forming mandrels 202 are equidistant from the vertical central axis of rotation of the rotary turret 201.

Figure 1:
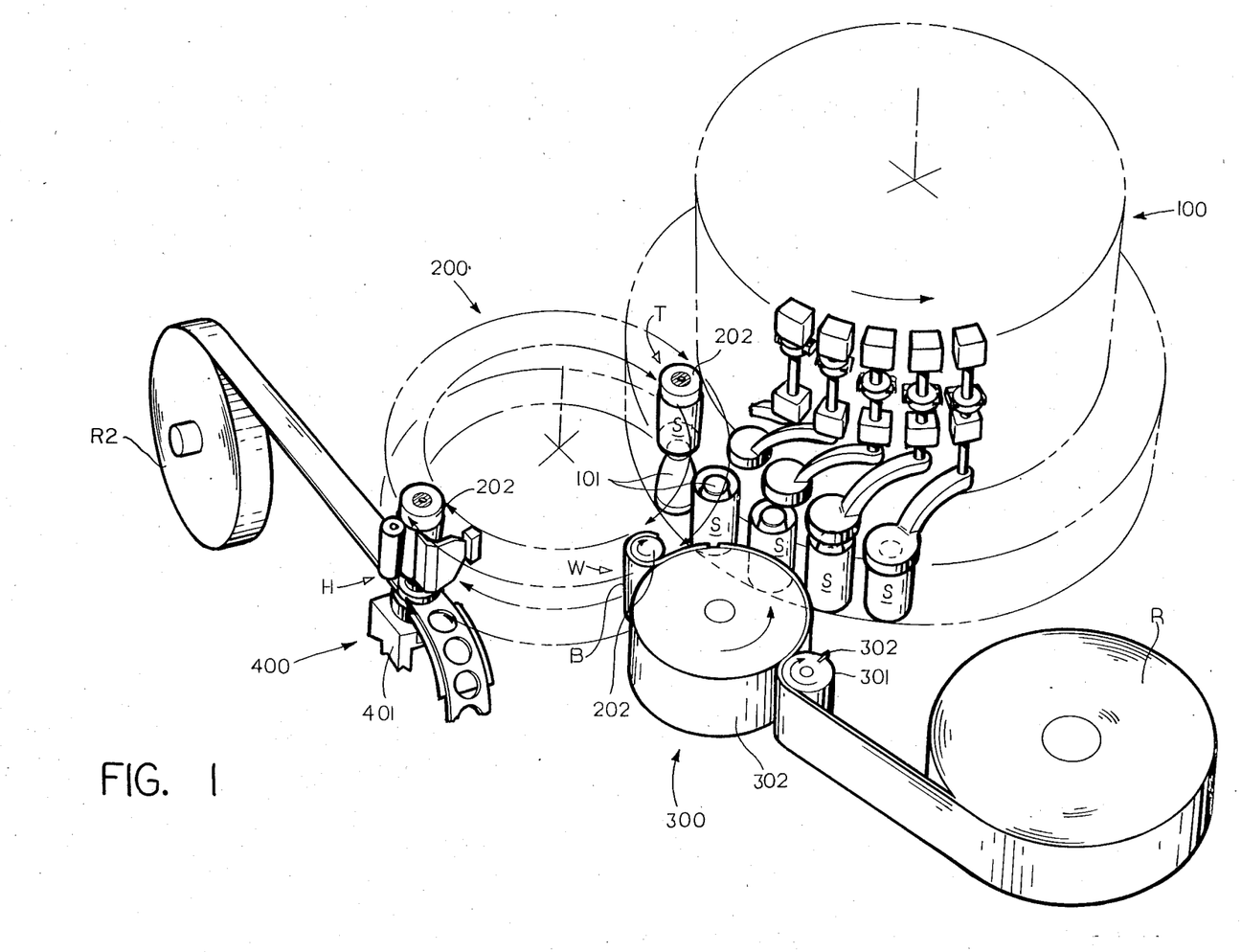
FIG. 1 is a schematic perspective view of a preferred embodiment of an apparatus in accordance with the present invention.

A rectangular blank B is wound around the sleeve forming mandrel 202 of the rotary sleeve forming machine 200 at a winding station W, as is shown in FIG. 2, the length of the blank B in the horizontal direction being greater than the circumference of the sleeve forming mandrel 202, so that the ends of the blank B overlap one another when it is wound around the sleeve forming mandrel 202. As is shown in FIGS. 1, 2, and 3, the blanks B are formed in succession by the sleeve blank processing apparatus 300, from a reel of the material used for the sleeve S, the sleeve blank processing apparatus including a feed roll 301 with a knife edge 302 extending vertically from the outer periphery of the feed roll 301. The knife edge 302 serves to cut the web being unwound from the reel R into blanks of predetermined horizontal length, which will be slightly greater than the circumference of the feed roll 301 in an installation where the feed roll 301 has only one knife edge 302 extending from its periphery. The cutting of the web being unwound from the reel R by the knife edge 302 on the feed roll 301 is facilitated by the use of a transfer drum 303 which is positioned, relative to the feed roll 301, to form a narrow space or nip therebetween, with the web being unwound from the reel R passing between the feed roll 301 and the transfer drum 303 so that the transfer drum 303 FIG. 2 acts as a backing material for the knife edge 302 to facilitate the cutting of the web by the knife edge 302.

After a blank B is wound around a sleeve forming mandrel 202 on the rotary sleeve forming machine 200, the rotary sleeve forming machine 200 is rotated to advance such sleeve forming mandrel 202 from the winding station W to a heat sealing station H where the overlapped edges of the blank B are heated and compressed to fuse to one another in a vertically extending, liquid-tight seam, thus completing the forming of the sleeve S. Further rotation of the rotary turret 201 of the rotary sleeve forming machine 200 will advance the sleeve forming mandrels 202 at the heat sealing station H to the transfer station T where the sleeve S is then transferred vertically downwardly to pass from the sleeve forming mandrel 202 to a cup-forming mandrel 102 on the rotary cup-forming machine. This transfer requires that the turret 101 of the rotary cup-forming machine 100 and the turret 201 of the rotary sleeve forming machine 200 be so positioned relative to one another that, at the transfer station T, a sleeve-forming mandrel 202 will have its vertical central axis aligned with the vertical central axis of a cup-forming mandrel 102, as is shown most clearly in FIG. 2. Preferably, a circle formed by the centers of the sleeve forming mandrels 202 will slightly overlap a circle formed by the centers of the cup-forming mandrels, so that a sleeve-forming mandrel 202 and a cup-forming mandrel will travel nearly parallel to one another for a finite nearly straight lineal path at the transfer station T to provide maximum time for the sleeve transfer.

Preferably, the transfer of a bottom disc D to a cup-forming mandrel 102 will take place at the time when a sleeve S is transferred from a sleeve forming mandrel 202 to a cup-forming mandrel 102, and to facilitate this simultaneous transfer, the bottom discs D are formed and transferred to the cylindrical sleeve forming mandrels 202 before the mandrels 202 are advanced to the transfer station T. Most conveniently, the discs D are transferred to the sleeve forming mandrels 202 at the heat sealing station H and, as is shown in FIG. 1, the bottom blank processing apparatus 400 includes a punching device 401 located below the sleeve forming mandrel 202 that is at the heat sealing station H, and the disc D is punched from a web that is being unwound from a second reel R2 of the bottom disc material by the punching device 401.

As is shown most clearly in FIG. 4, the rotary sleeve forming machine 200 has, below the level of the rotary turret 201, a rotary platform 203 that rotates with the rotary turret 201. The platform 203 carries a multiplicity of hot-air distributors 204 with one hot-air distributor 204 being positioned adjacent each of the sleeve forming mandrels 202 in fixed position relative to such sleeve forming mandrel, so that such hot air distributor 204 and such sleeve forming mandrel 202 at all times rotate in a fixed relationship relative to one another. The hot air distributors 204 receive hot air through a hot air line 205 and a hot air distribution plate 206 that is non-rotatable relative to the rotating platform 203, so that hot air flows through a hot air distributor 204 only when the hot air distributor 204 is positioned above the hot air distribution plate 206, which only occurs at the heat-sealing station H.

Also associated with each sleeve forming mandrel 202 is a vertically reciprocable stripper bar 207 which surrounds at least a substantial portion of each such sleeve forming mandrel 202 at an elevation above the elevation of the sleeve being wound on such sleeve forming mandrel 202. The stripper bar 207 with the sleeve forming mandrel 202 at the transfer station T is driven downwardly, by means which will be hereafter described more fully, to facilitate the transfer of the sleeve from the sleeve forming mandrel 202 at the transfer station to the cup-forming mandrel 102 at the transfer station, as is shown more clearly in the left-hand portion of FIG. 1.

Figure 5:
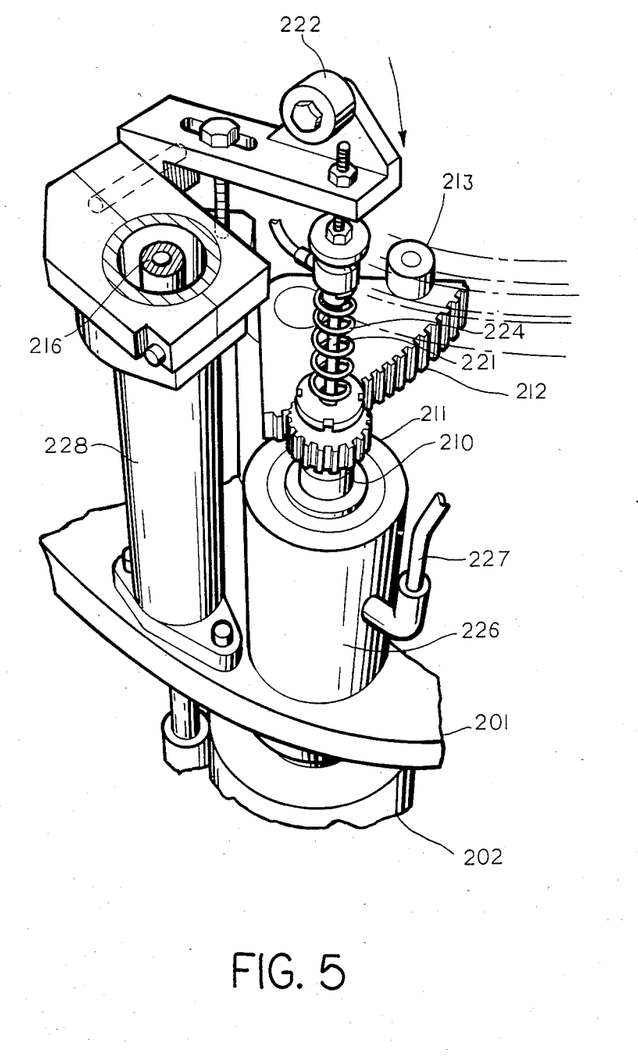
FIGS. 5 and 6 are fragmentary perspective views showing a portion of the apparatus shown in FIGS. 1, 2 and 4.
Figure 6:
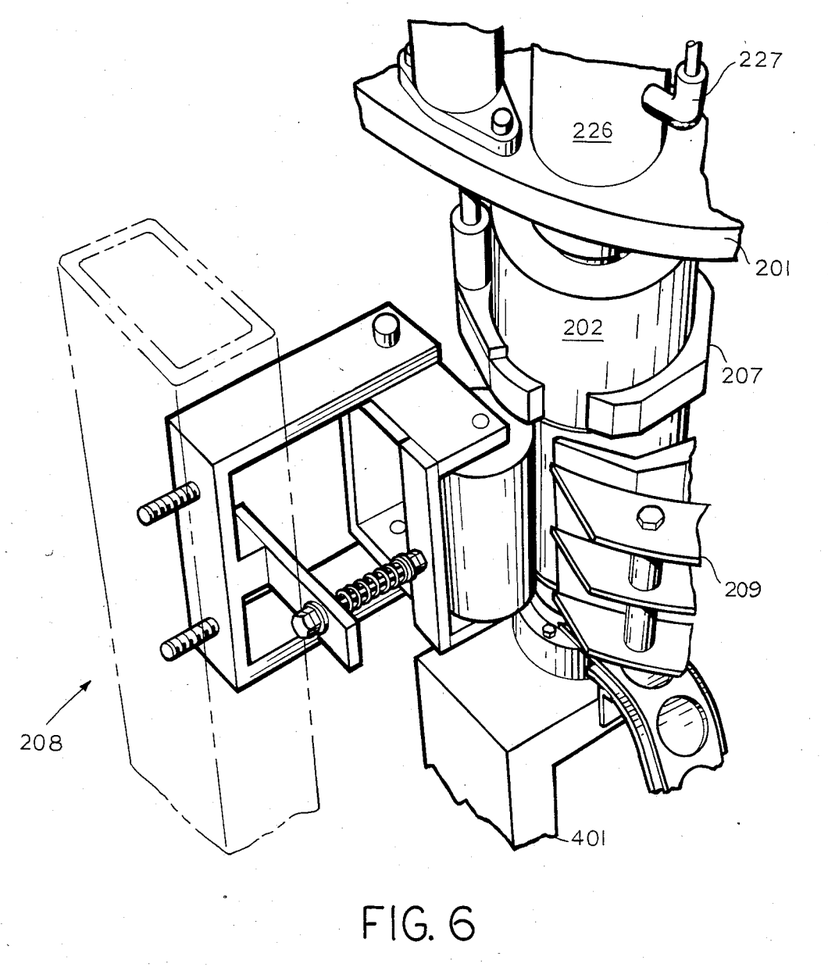
Figure 7:
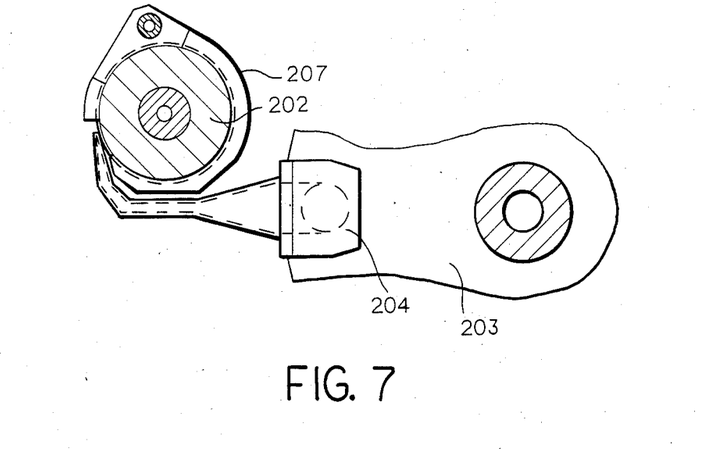
FIG. 7 is a sectional view taken on line 7—7 of FIG. 4.

The sealing of the overlapped ends of the blank B at the heat sealing station H is assisted by a spring-mounted compression roller, indicated generally at 208, which is positioned at the heat sealing station H and which compresses the overlapped ends of the blank together after they have been heated by air flowing through the hot air distributor 204 at the heat sealing station H. The natural tendency of the unsealed overlapped edges of the blank B to unwind, as the wound blank B passes from the winding station W to the heat sealing station H, is prevented by providing an arcuate guide member or shoe 209 extending between the winding station W and the heat sealing station H to physically interfere with the unwinding of the blanks B as the sleeve forming mandrels 202 carrying such wound blanks B pass from the winding station W to the heat sealing station H. As is shown in FIGS. 4, 5, and 6, each sleeve forming mandrel 202 has a vertical central shaft 210 which extends above the plane of the rotary turret 201 and which has a spur gear 211 affixed thereto. Also associated with each sleeve forming mandrel 202, and extending upwardly from the rotary turret 201, is a column 228 that carries a segment gear 212 that engages the spur gear 211 on the vertical central shaft 210 of the associated sleeve forming mandrel 202. Each segment gear 212 carries a cam follower 213 that rides in the cam track 214 on a platform 215 that rotates with the rotary turret 201. The configuration of the cam track 214 is such that it drives the segment gear 212 through a limited arc in a horizontal plane when it is desired to impart a rotational movement to a sleeve forming mandrel, by means of the spur gear 211, and this movement occurs at the winding station W to assist in the winding of a blank B onto the sleeve forming mandrel 202 when it is positioned at the winding station W.

The vertical actuation of the stripper bar 207 at the transfer station T is also cam actuated, the stripper bar 207 being mounted on a stripper bar shaft 216 which carries a cam follower 217 mounted near the upper end thereof. The cam follower 217 of the stripper bar shaft 216 rides in the groove of a cam track 218, and the configuration of the cam track 218 is such that the stripper bar shaft is driven downwardly when the sleeve forming mandrel 202 comes into position at the transfer station T, the position shown on the left side of the drawing of FIG. 4, and is then driven upwardly after the sleeve forming mandrel leaves the transfer station T.

Figure 9:
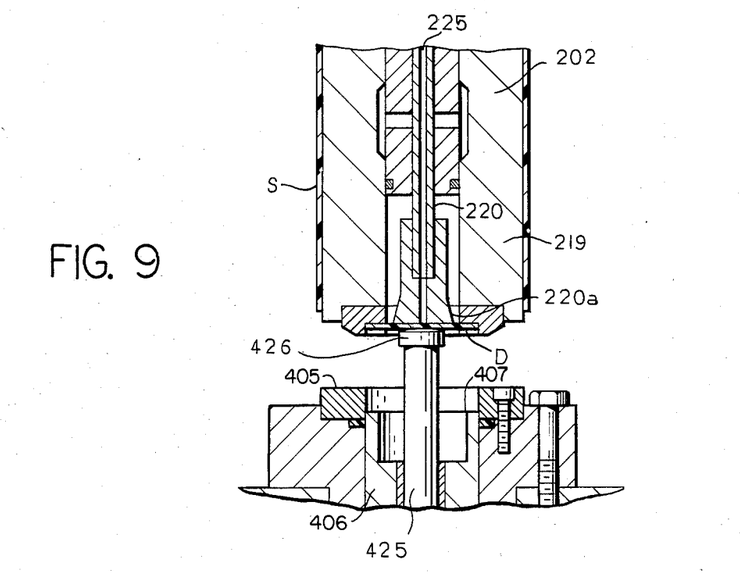
FIGS. 9 and 10 are fragmentary views, at an enlarged scale and partly in section, of a portion of the apparatus shown in FIG. 8, FIG. 10 showing the apparatus at a subsequent stage in its operation from that shown in FIGS. 8 and 9.
Figure 10:
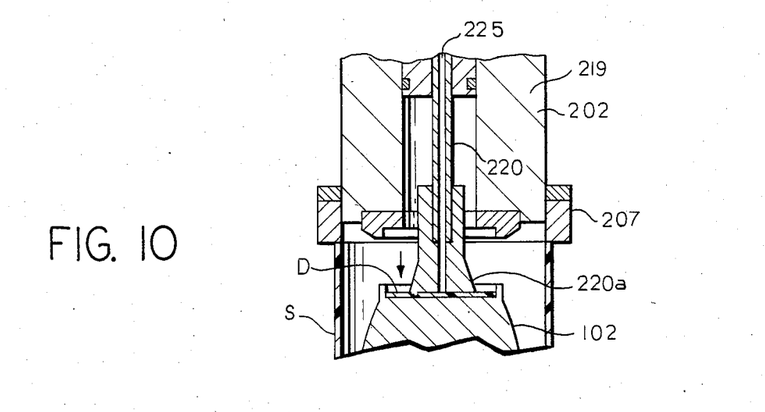

As is shown in FIGS. 9 and 10, each sleeve forming mandrel 202 has an annular outer portion 219 and an inner portion 220. The inner portion 220 is vertically reciprocable relative to the annular outer portion 219 of each sleeve forming mandrel 202 to effect the transfer of the bottom disc D to the cup forming mandrel 102 at the transfer station T. As is shown in FIG. 5, the reciprocation of the inner portion 220 of the sleeve forming mandrel 202 relative to the annular outer portion 219 is accomplished by mounting the inner portion 220 on a shaft 221 which extends upwardly beyond the upper level of the annular outer portion 219 and, as is shown in FIG. 4, by providing the shaft 221 with a cam follower 222 that engages the underside of a cam surface 223 when the sleeve forming mandrel 202 is at the transfer station T. The upper portion of the shaft 221 is biased upwardly against the underside of the cam surface 223 by means of a spring 224, the camming action of the cam surface 223 on the cam follower 222 overcoming the upwardly biasing affect of the spring 224 only when the sleeve forming mandrel 202 is at the transfer station T.

Each inner portion 220 of each sleeve forming mandrel 202 is itself of annular or tubular configuration, to define a passage 225 extending through each such inner portion 220. The upper portion of each such sleeve forming mandrel 202 has a jacket 226 that is connected to a source of vacuum through a line 227, shown fragmentarily in FIGS. 4 and 5, which is, in turn, connected to the annular passage 225 to assist in holding the bottom disc D in position until such sleeve forming mandrel reaches the transfer station T, the reciprocation of the inner portion 220 with respect to the annular outer portion 219 at the transfer station breaking the vacuum to the disc contacting a lowermost surface 220a of the inner portion 220 at the transfer station T to assist in the transfer of the bottom disc D from the sleeve forming mandrel 202 to the cup forming mandrel 102.

Figure 8:
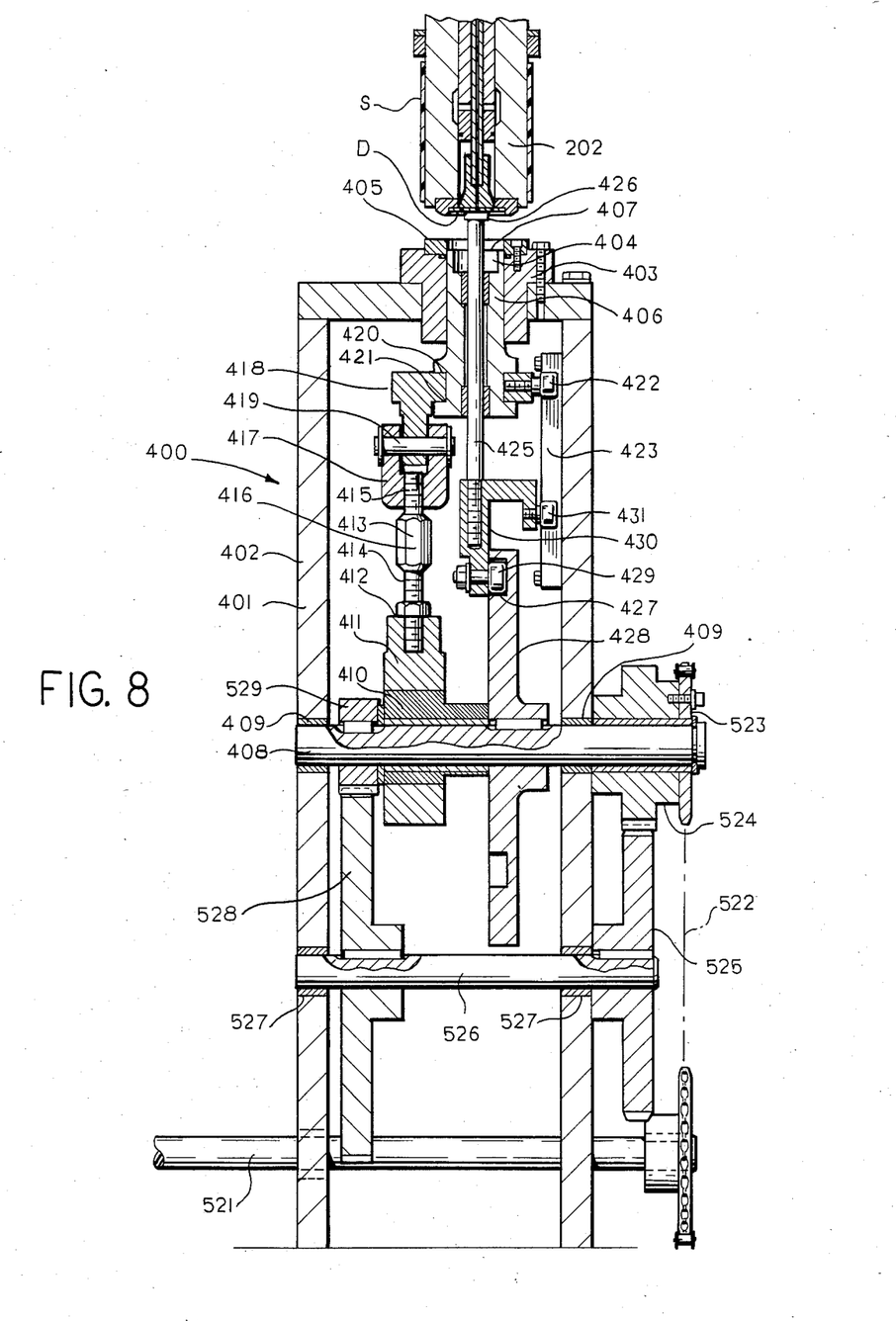
FIG. 8 is a fragmentary elevational view, partly in section, showing a portion of the apparatus shown in FIGS. 1 through 3.

As is shown in FIG. 8, the punching device 401 of the bottom blank processing apparatus 400 includes a supporting structure 402 that supports a generally horizontally disposed supporting element 403 that is located at the top of the supporting structure 402. The supporting element 403 has an opening 404 therein that corresponds to the size and the shape of the disc D that is to be punched from the web being unwound from the reel R2 of the bottom disc material. Preferably, the opening 404 is circular in configuration. The web that is being processed by the bottom blank processing apparatus 400 is retained in place against the top surface of the supporting element 403 by means of a hold-down element 405, the edges of the web being drawn through a space between the hold-down element 405 and the supporting element 403 that is approximately equal to the thickness of such web.

A disc D is punched from the portion of the web that is located above the opening 404 in the supporting element 403 of the bottom blank processing apparatus 400 by means of a vertically reciprocable punch 406 which has an upper annular punching portion 407 that reciprocates into and out of the opening 404 in the supporting element 403 upon each reciprocation of the punch 406. Further, the annular punching portion 407 of the punch 406 is dimensioned, with respect to the inside of the opening 404, to pass within the opening 404 with minimal clearance between the inside surface of the opening 404 and the outside surface of the annular punching portion 407, for optimum punching performance.

Reciprocation of the punch 406 of the bottom blank processing apparatus 400 is effected by a drive that includes a rotating shaft 408, which is suitably journaled in the supporting structure 403 by means of bushings 409. The shaft 408 carries an eccentric 410 that is keyed to the shaft 408 for rotation therewith. The eccentric rotates in an annular collar 411 and the rotation of the eccentric 410 within the annular collar 411 causes the top 412 of the annular collar to reciprocate in a vertical pattern. The top 412 of the annular collar 411 has a tie-rod 413 fastened thereinto, the tie-rod 413 preferably being adjustable in length, a feature which can be obtained by constructing it of first and second threaded members 414 and 415 with a length adjusting nut 416 connecting the first and second threaded members 414 and 415. The upper end of the tie-rod 413 is connected to a yoke 417 and the yoke 417, in turn, is connected to a clevis 418 by means of a pin 419, which permits limited pivoting movement between the clevis 418 and the yoke 417. The clevis 418 has an outwardly projecting finger 420, and the outwardly projecting finger 420 of the clevis 418 is trapped in an outwardly facing notch 421 of the punch 406 near the bottom thereof. Thus, the reciprocating movement which is imparted to the top 412 of the annular collar 411 by the rotation of the eccentric 410 in the annular collar 411 is transmitted to the punch 406 by virtue of its connection to the clevis 418, and the connection of the clevis 418 to the yoke 417 through the pin 419 and the connection of the yoke 417 to the annular collar 411 by means of the tie-rod 413.

The outwardly facing notch 421 of the punch 406 is preferably annular in configuration, and one portion of the notch 421, away from the portion that engages the outwardly projecting finger 420 of the clevis 418, has a cam follower 422 extending therefrom. The cam follower 422 rides along a cam surface 423 as the punch 406 reciprocates upwardly and downwardly, and the contact between the cam follower 422 and the cam surface 423 guides such reciprocation of the punch 406.

The transfer of a punched out disc D from the bottom blank processing apparatus 400 is effected 64 means of a vertically reciprocable lift rod 425 that reciprocates within the punch 406 but independently thereof. The reciprocation stroke of the lift rod 425 is sufficient to reciprocate a pad 426 at the upper end of the lift rod 425 from a position below the level of the supporting element 403 to a position adjacent the lowermost surface 220a of the inner portion 220 of a sleeve forming mandrel 202, when the vertical axis of the sleeve forming mandrel 202 is in alignment with the lift rod 425, to transfer the punched disc D from the lift rod 425 to such sleeve forming mandrel 202.

The reciprocation of the lift rod 425 is effected by means of a grooved cam surface 427 in a disc 428 that is affixed to the shaft 408 and rotates therewith. The rotation of the shaft 408 raises and lowers the 12 o'clock position of the grooved cam surface 427, and the raising and lowering of the grooved cam surface 427 is transmitted to the lift rod 425 by means of a cam follower 429 that is carried by a bracket 430 to which the lift rod 425 is affixed. The bracket 430 is generally in the configuration of an inverted L, and the lift rod 425 is threadably engaged in the upper portion of the vertically extending leg of the bracket 430. The other leg of the L-shaped bracket is a horizontal leg that carries a cam follower 431 that also follows along the cam surface 423 to guide the vertical reciprocation of the lift rod 425.

Referring now to the FIG. 3, the drive train 500 for driving the various drive mechanisms heretofore described includes a motor 501 whose output shaft 502 is connected to a first drive shaft 503 by means of a V-belt drive 504. The first drive shaft 503 has a drive gear 505 that drivingly engages a second gear 506 on a second drive shaft 507. One end of the second drive shaft 507 drives the vertical drive shaft 508 of the forming machine 100 through a speed reducer 509. The second drive shaft 507 also drives a chain and sprocket drive 510, and the chain and sprocket drive 510 drives the input shaft 511 of a speed reducer 512, the output shaft 513 of which drives a drive gear 514. The drive gear 514 drives a driven gear 515 at the lower end of a vertical drive shaft 516 that is the drive shaft for the transfer drum 303 of the sleeve blank processing apparatus 300. The vertical drive shaft 516 also carries a drive gear 517 that drives a driven gear 518 that is affixed to the lower end of a vertical drive shaft 519. The vertical drive shaft 519 rotatingly drives the feed roll 301 of the sleeve blank processing apparatus 300.

The other end of the second drive shaft 507 also drives a chain and sprocket drive 520, and the chain and sprocket drive 520 drives an input drive shaft 521, also shown in FIG. 8, which drives the various mechanisms of the bottom blank processing apparatus 400. As shown in FIG. 8, the input drive shaft 521 drives the shaft 408 of the bottom blank processing apparatus 400 through a chain and sprocket drive 522 that includes a driven sprocket 523. The driven sprocket 523 is attached to a drive gear 524 that is keyed to the shaft 408, and the drive gear 524 drives a driven gear 525 that is keyed to another shaft 526 that is journaled in the supporting structure 402 of the bottom blank processing apparatus by bushings 527. The shaft 526 carries a drive gear 528 that drivingly engages a driven gear 529 that is keyed to the shaft 408. The rotation of the driven gear 529 rotates the shaft 408 to effect rotation of the eccentric 410 and the disc 428, as heretofore described.

Referring again to FIG. 3, the vertical drive shaft 508 of the rotary cup forming machine 100 has a portion 508a that extends upwardly therefrom, and the portion 508a of the drive shaft 508 drives a chain and sprocket drive 530. The chain and sprocket drive 530 drives a vertical drive shaft 531, and the vertical drive shaft 531 carries a drive gear 532 affixed thereto. The drive gear 532 drivingly engages a driven gear 533 that is attached to a vertical drive shaft 534, the vertical drive shaft 534 being the drive shaft of the turret 201 of the rotary sleeve forming machine 200, as is shown in FIG. 4. Thus, by means of the drive train 500 illustrated in FIG. 3, all of the mechanical movements of the various elements of the cup forming machine of the present invention are properly timed, integrated and coordinated with one another, permitting continuous as opposed to intermittent driving of the machine. Further, any increase or decrease in the operating speed of any of the elements of the cup forming machine inherently increases or decreases the speed of the associated mechanisms of the machine.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A method of fabricating a nestable container comprising the steps of:
   (i) providing a first rotary turret, said first rotary turret having a vertically extending central axis and being rotatable in a first horizontal plane about said vertically extending central axis;
   (ii) providing a plurality of cylindrical winding mandrels on said first rotary turret, each of said plurality of cylindrical winding mandrels having a substantially equal outside diameter and a vertically extending mandrel central axis and being rotatable about said vertically extending mandrel central axis, the vertically extending mandrel central axes of said cylindrical winding mandrels being equidistant from said vertically extending central axis of said first rotary turret;
   (iii) providing a winding station adjacent a first of said plurality of cylindrical winding mandrels;
   (iv) providing a seam-sealing station adjacent a second of said plurality of cylindrical winding mandrels;
   (v) providing a second rotary turret, said second rotary turret having a second vertically extending central axis and being rotatable in a second horizontal plane about said second vertically extending central axis, said second horizontal plane being vertically displaced from said first horizontal plane;
   (vi) providing a plurality of generally frustoconical container forming mandrels on said second rotary turret, each of said plurality of generally frustoconical container forming mandrels having a vertically extending container forming mandrel central axis, the vertically extending container forming mandrel central axes of said plurality of generally frustoconical container forming mandrels being equidistant from said second vertically extending central axis of said second rotary turret, each of said plurality of generally frustoconical container forming mandrels having a generally circular small end and a generally circular large end, said generally circular small end and said generally circular large end being vertically displaced from each other, said generally circular small end being closer to said first horizontal plane than said generally circular large end and having a diameter that is substantially smaller than said outside diameter of each of said cylindrical winding mandrels;
   (vii) positioning said first rotary turret and said second rotary turret so that a third of said plurality of cylindrical winding mandrels has its vertically extending mandrel central axis nearly aligned with the vertically extending container forming mandrel central axis of one of said plurality of generally frustoconical container forming mandrels at a transfer station;
   (viii) winding a rectangular blank of a semi-rigid heat-shrinkable thermoplastic material about said first of said plurality of cylindrical winding mandrels at a winding station, said winding station being adjacent said first of said plurality of cylindrical winding mandrels, the lineal dimension of said blank, in the horizontal direction, being slightly greater than the circumference of said first of said winding mandrels, so that said blank is wound into a wound cylinder with overlapping ends;
   (ix) rotating said first rotary turret through a first portion of a circular arc to advance said first of said plurality of cylindrical winding mandrels to said seam-sealing station;
   (x) sealing said overlapping ends of said wound cylinder to one another at said seam-sealing station;
   (xi) rotating said first rotary turret through a second portion of said circular arc to advance said first of said cylindrical winding mandrels and said wound cylinder to said transfer station;
   (xii) rotating said second rotary turret through a second circular arc to present one of said plurality of generally frustoconical container forming mandrels at said transfer station, said second circular arc being aligned with said circular arc at a first point and at a second point, said second point being spaced from said first point along said circular arc so that said first of said plurality of cylindrical winding mandrels and said one of said plurality of generally frustoconical container forming mandrels travel nearly parallel to one another between said first point and said second point;
   (xiii) vertically transferring said wound cylinder from said first of said plurality of cylindrical winding mandrels to said one of said plurality of generally frustoconical container forming mandrels at said transfer station, said transferring step occurring over a finite period of time during which said vertically extending mandrel central axis and said vertically extending container forming mandrel central axis are approximately in vertical alignment; and
   (xiv) forming a nestable container from said transferred wound cylinder on said one of said plurality of generally frustoconical container forming mandrels.

2. The method according to Claim 1 wherein said first horizontal plane is higher in elevation than said second horizontal plane, wherein said generally circular small end of each of said plurality of generally frustoconical container forming mandrels is higher than said generally circular large end of said each of said plurality of generally frustoconical container forming mandrels and wherein said wound cylinder is transferred vertically downwardly from said second of said plurality of cylindrical winding mandrels to said one of said plurality of generally frustoconical container forming mandrels.

3. The method according to claim 1 further comprising:
- (xv) repeating vii, viii, ix, x and xi to successively present a plurality of wound cylinders at said transfer station;
- (xvi) rotating said second rotary turret to present another of said plurality of generally frustoconical container forming mandrels at said transfer station after completion of step xii, and repeating step xii with each step xiv to successively transfer said wound cylinders to said plurality of generally frustoconical container forming mandrels; and
- (xvii) repeating step xiv to form a nestable container from each of said transferred wound cylinders.

4. The method according to claim 2 further comprising:
- (xiv) repeating steps vii, viii, ix, x and xi to successively present a plurality of wound cylinders at said transfer station;
- (xv) rotating said second turret to present another of said plurality of generally frustoconical container forming mandrels at said transfer station after completion of step xii, and repeating step xii with each step xiv to successively transfer said wound cylinders to said plurality of generally frustoconical container forming mandrels; and
- (xvi) repeating step xiii to form a nestable container from each of said transferred wound cylinders.

5. A method of fabricating a nestable container, said nestable container comprising a sidewall that is formed from a rectangular blank of a semi-rigid heat shrinkable thermoplastic material and a bottom that is formed from a disc of a sheetlike material that is sealable to said sidewall, said method comprising the steps of:
- (i) providing a first rotary turret, said first rotary turret having a vertically extending central axis and being rotatable in a first horizontal plane about said vertically extending central axis;
- (ii) providing a plurality of cylindrical winding mandrels on said first rotary turret, each of said plurality of cylindrical winding mandrels having a substantially equal outside diameter and a vertically extending mandrel central axis and being rotatable about said vertically extending mandrel central axis, the vertically extending mandrel central axes of said cylindrical winding mandrels being equidistant from said vertically extending central axis of said first rotary turret;
- (iii) providing a winding station adjacent a first of said plurality of cylindrical winding mandrels;
- (iv) providing a seam-sealing station adjacent a second of said plurality of cylindrical winding mandrels;
- (v) providing a bottom disc transfer station adjacent one of said plurality of cylindrical winding mandrels;
- (vi) providing a second rotary turret, said second rotary turret having a second vertically extending central axis and being rotatable in a second horizontal plane about said second vertically extending central axis, said second horizontal plane being vertically displaced from said first horizontal plane;
- (vii) providing a plurality of generally frustoconical container forming mandrels on said second rotary turret, each of said plurality of generally frustoconical container forming mandrels having a vertically extending container forming mandrel central axis, the vertically extending container forming mandrel central axes of said plurality of generally frustoconical container forming mandrels having a generally circular small end and a generally circular large end, said generally circular small end and said generally circular large end being vertically displaced from each other, said generally circular small end being closer to said first horizontal plane than said generally circular large end and having a diameter that is substantially smaller than said outside diameter of each of said cylindrical winding mandrels;
- (viii) positioning said first rotary turret and said second rotary turret so that a third of said plurality of cylindrical winding mandrels has its vertically extending mandrel central axis aligned with the vertically extending container forming mandrel central axis of one of said plurality of generally frustoconical container forming mandrels at a sleeve transfer station;
- (ix) winding a rectangular blank of a semi-rigid heat shrinkable thermoplastic material about said first of said plurality of cylindrical winding mandrels at a winding station, said winding station being adjacent said first of said plurality of cylindrical winding mandrels, the lineal dimension of said blank in the horizontal direction, being slightly greater than the circumference of said first of said winding mandrels, so that said blank is wound into a wound cylinder with overlapping ends;
- (x) rotating said first rotary turret through a first arc to advance said first of said plurality of cylindrical winding mandrels to said seam-sealing station;
- (xi) sealing said overlapping ends of said wound cylinder to one another at said seam-sealing station;
- (xii) rotating said first rotary turret through a second arc to advance said first of said cylindrical winding mandrels, said wound cylinder and said disc to said sleeve transfer station;
- (xiii) transferring said disc to an end of said plurality of cylindrical winding mandrels at said bottom disc transfer station, said bottom disc transfer station being located, with respect to said seam-sealing station, to transfer said disc to said first of said plurality of cylindrical winding mandrels before said first of said cylindrical winding mandrels is advanced to said sleeve transfer station;
- (xiv) vertically transferring said wound cylinder and said disc from said first of said plurality of cylindrical winding mandrels to one of said plurality of generally frustoconical container forming mandrels at said sleeve transfer station, said transferring step occurring over a finite period of time during which said vertically extending mandrel central axis and said vertically extending container forming mandrel central axis are approximately in vertical alignment; and
- (xv) forming a nestable container from said transferred wound cylinder and said disc on said one of said plurality of generally frustoconical container forming mandrels.

6. The method according to claim 5 wherein said first horizontal plane is higher in elevation than said second horizontal plane, wherein said generally circular small end of each of said plurality of generally frustoconical container forming mandrels is higher than said generally circular large end of said each of said plurality of generally frustoconical container forming mandrels, wherein said disc is transferred to the bottom of said first of said plurality of cylindrical winding mandrels at said bottom disc transfer station, and wherein said wound cylinder and said disc are transferred vertically downwardly from said second of said plurality of cylindrical winding mandrels to said one of said plurality of generally frustoconical container forming mandrels.

7. The method according to claim 5 further comprising:
(xvi) repeating steps viii, ix, x, xi, xii, and xiii to successively present a plurality of units at said sleeve transfer station, each of said units comprising a wound cylinder and a disc;
(xvii) rotating said second rotary turret to present another of said plurality of generally frustoconical container forming mandrels at said sleeve transfer station after completion of step xiv, and repeating step xiv with each step xvi to successively transfer said units to said plurality of generally frustoconical container forming mandrels; and
(xviii) repeating step xv to form a nestable container from each of said transferred units.

8. The method according to claim 6 further comprising:
(xvi) repeating steps, viii, ix, x, xi, xii, and xiii to successively present a plurality of units at said transfer station, each of said units comprising a wound cylinder and a disc;
(xvii) rotating said second rotary turret to present another of said plurality of generally frustoconical container forming mandrels at said transfer station after completion of step xiv, and repeating step xiv with each step xvi to successively transfer said wound units to said plurality of generally frustoconical container forming mandrels; and
(xviii) repeating step xv to form a nestable container from each of said transferred units.

9. The method according to claim 5 wherein said disc is transferred to said first of said plurality of cylindrical winding mandrels after said blank has been wound into a wound cylinder with overlapping ends.

10. The method according to claim 9 wherein said bottom disc transfer station is positioned adjacent said seam-sealing station and said disc is transferred to said first of said cylindrical winding mandrels while said first of said cylindrical winding mandrels is at said seam-sealing station.

11. The method according to claim 6 and further comprising the step of:
(xvi) retaining said disc against said bottom of said plurality of cylindrical winding mandrels after the transfer of said bottom disc from said bottom disc transfer station to said sleeve transfer station.

12. In an apparatus for fabricating nestable containers from generally cylindrical sleeves of a heat-shrinkable, thermoplastic material, said apparatus comprising a plurality of generally frustoconical container forming mandrels, each of said generally frustoconical container forming mandrels having a central axis, a small end pointing in a first direction and a large-end pointing in a second direction, said second direction being opposite to said first direction, said apparatus further comprising means for advancing the central axes of said plurality of generally frustoconical container forming mandrels in succession in a first circular path, improved means for fabricating generally cylindrical sleeves of a heat-shrinkable thermoplastic material and for transferring said generally cylindrical sleeves, in succession to said generally frustoconical container forming mandrels, said improved means comprising, in combination:
a plurality of generally cylindrical sleeve forming mandrels, each of said generally cylindrical sleeve forming mandrels having a central axis;
means for advancing the central axes of said plurality of generally cylindrical sleeve forming mandrels, in succession, in a second circular path, said second circular path overlapping said first circular path such that a first point of said second circular path is generally aligned with a first point of said first circular path and a second point of said second circular path is generally aligned with a second point of said first circular path, said second point of said second circular path being spaced from said first point of said second circular path so that said first of said generally cylindrical sleeve forming mandrels travels nearly parallel to said one of said generally frustoconical container forming mandrels from said first point of said second circular path to said second point of said second circular path;
means for applying rectangular blanks of a heat-shrinkable thermoplastic material, in succession, to said plurality of generally cylindrical sleeve forming mandrels at a third point in said second circular path, each of said blanks having a length that is greater than the circumference of the generally cylindrical sleeve forming mandrels to which it is applied;
means for successively winding said rectangular blanks of heat-shrinkable thermoplastic material around said plurality of generally cylindrical sleeve forming mandrels at said third point along said second circular path so that the ends of each of said blanks overlap one another;
means for successively joining the overlapped ends of each of said rectangular blanks to one another at a fourth point along said second circular path that is away from said first and second points and from said third point to form a generally cylindrical sleeve form each of said rectangular blanks; and
means for successively transferring the generally cylindrical sleeves from said generally cylindrical sleeve forming mandrels to said generally frustoconical container forming mandrels between said first point and said second point, said means for successively transferring the generally cylindrical sleeves being operable to transfer each of said generally cylindrical sleeves being transferred over the generally frustoconical container forming mandrel to which it is being transferred over the small end of said generally frustoconical container forming mandrels, said transferring occurring over a finite period of time while said portion of said second circular path overlaps said portion of said first circular path.

13. Apparatus according to claim 12 wherein said first circular path lies in a first horizontal plane and wherein said second circular path lies in a second horizontal plane, said second horizontal plane being vertically displaced from said first horizontal plane.

14. Apparatus according to claim 13 wherein said second horizontal plane is above said first horizontal plane.

15. Apparatus according to claim 12 wherein said means for advancing said plurality of generally frustoconical container forming mandrels comprises first non-intermittently driven means including a motor for driving said first non-intermittently driven means and wherein said means for advancing said plurality of generally cylindrical mandrels comprises second non-intermittently driven means, said second non-intermittently drive means also being driven by said motor.

16. Apparatus according to claim 12 wherein each of said generally cylindrical sleeve forming mandrels has a central axis and is rotatable about said central axis and wherein said means for successively winding said retangular blanks of heat-shrinkable thermoplastic material around said generally cylindrical sleeve forming mandrels comprises means for rotating each of said generally cylindrical sleeve forming mandrels at said third point of said second circular path.

17. Apparatus according to claim 12 wherein said means for applying rectangular blanks of a heat-shrinkable thermoplastic material, in succession, to said plurality of generally cylindrical sleeve forming mandrels comprises an unwind stand for supporting a coiled web of indefinite length of said heat-shrinkable thermoplastic material and roller means for feeding said web from said unwind stand to said third point in said second circular path, said roller means including knife means for cutting said web to form said blanks therefrom.

18. Apparatus according to claim 12 wherein said means for successively joining the overlapped ends of each of said rectangular blanks to one another comprises heat-sealing means.

19. Apparatus according to claim 18 wherein said heat-sealing means comprises warm air distribution means for heating the ends of each of said rectangular blanks and roller means for pressing the heated edges of each of said rectangular blanks against one another.

20. Apparatus according to claim 19 wherein said warm air distribution means comprises a plurality of warm air distributors, each of said plurality of warm air distributors being fixedly associated with one of said plurality of generally cylindrical sleeve forming mandrels, and selector means for selectively causing warm air to successively flow into said plurality of warm air distributors at said fourth point along said second circular path.

21. Apparatus according to claim 12 wherein said means for successively transferring the generally cylindrical sleeves from said generally cylindrical sleeve forming mandrels comprises a plurality of reciprocable pusher means, each of said plurality of reciprocable pusher means being operatively associated with one of said plurality of generally cylindrical sleeve forming mandrels, and means for successively reciprocating each of said reciprocable pusher means at said first and second points.

22. Apparatus according to claim 21 wherein each of pusher means comprises arcuately-shaped means that at least partially surrounds the generally cylindrical sleeve forming mandrel with which it is operatively associated.

23. An apparatus for fabricating nestable containers, each such nestable container being fabricated from a generally cylindrical sleeve of a heat-shrinkable thermoplastic material and a disc of a material that is sealable to said heat-sealable thermoplastic material, said apparatus comprising a plurality of generally frustoconical container forming mandrels, each of said plurality of generally frustoconical container forming mandrels having a small end pointing in a first direction and a large end pointing in a second direction, said second direction being opposite to said first direction, said apparatus further comprising means for advancing said plurality of generally frustoconical container forming mandrels in succession in a first endless pattern, improved means for fabricating generally cylindrical sleeves of a heat-shrinkable thermoplastic material and for fabricating discs of a material that is sealable to said heat-sealable thermoplastic material and for transferring said cyindrical sleeves and said discs to said generally frustoconical containers forming mandrels comprising, in combination:

a plurality of generally cylindrical sleeve forming mandrels each of said plurality of generally cylindrical sleeve forming mandrels having an end;

means for advancing said plurality of generally cylindrical sleeve forming mandrels, in succession, in a second endless pattern, a first point of said second endless pattern being aligned with a first point of said first endless pattern;

means for successively forming generally cylindrical sleeves of a heat-shrinkable thermoplastic material on said generally cylindrical sleeve forming mandrels at a point of said second endless pattern that is away from said first point of said second endless pattern;

means for forming discs of a material that is sealable to said heat-shrinkable thermoplastic material and for applying said discs, in succession, to the ends of said generally cylindrical sleeve forming mandrels at a point of said second endless pattern that is away from said first point of said second endless pattern; and means for successively transferring said generally cylindrical sleeves and discs, in sets, to said generally frustoconical container forming mandrels at said first point of said second endless pattern, each of said sets comprising one of said generally cylindrical sleeves and one of said discs.

24. Apparatus according to claim 23 wherein said first endless pattern lies in a first horizontal plane and wherein said second endless pattern lies in a second horizontal plane, said second horizontal plane being vertically displaced from said first horizontal plane.

25. Apparatus according to claim 24 wherein said second horizontal plane is above said first horizontal plane.

26. Apparatus according to claim 23 wherein said second endless pattern is a circular pattern.

27. Apparatus according to claim 26 wherein said first endless pattern is a circular pattern.

28. Apparatus according to claim 23 wherein said means for advancing said plurality of generally frustoconical container forming mandrels comprises first non-intermittently driven means including a motor for driving said first non-intermittently driven means and wherein said means for advancing said plurality of generally cylindrical mandrels comprises second non-intermittently driven means, said second non-intermittently driven means also being driven by said motor.

29. Apparatus according to claim 23 wherein said means for successively forming generally cylindrical sleeves comprises:

means for applying rectangular blanks of said heat-shrinkable thermoplastic material, in succession, to said plurality of generally cylindrical sleeve forming mandrels at a second point of said second endless pattern, each of said blanks having a length that is greater than the circumference of the generally cylindrical sleeve forming mandrel to which it is applied; and means for successively joining the overlapped ends of each of said blanks to one another at a third point of said second endless pattern that is away from said first point and said second point.

30. Apparatus according to claim 29 wherein said means for forming discs of a material that is sealable to said heat-sealable thermoplastic material and for applying said discs, in succession, to the ends of said generally cylindrical sleeve forming mandrels applies said discs to said ends of said generally cylindrical sleeve forming mandrels at said third point of said second endless pattern.

31. Apparatus according to claim 23 wherein said means for forming discs of a material that is sealable to said heat-sealable material and for applying said discs, in succession, to the ends of said generally cylindrical sleeve forming mandrels comprises, in combination:

an unwind stand adjacent said plurality of generally cylindrical sleeve forming mandrels for supporting a coiled web of indefinite length of said material;

punch means located away from said unwind stand for receiving said coiled web from said unwind stand and for punching discs from said coiled web;

feed means cooperative with said punch means for feeding said coiled web through said punch means;

reciprocable disc transfer means adjacent said plurality of generally cylindrical sleeve forming mandrels for transferring said discs, in succession, to said generally cylindrical sleeve forming mandrels; and means for reciprocating said reciprocable disc transfer means.

32. Apparatus according to claim 25 wherein said means for successively forming generally cylindrical sleeves comprises:

means for applying rectangular blanks of said heat-shrinkable thermoplastic material, in succession, to said plurality of generally cylindrical sleeve forming mandrels at a second point of said second endless pattern, each of said blanks having a length that is greater than the circumference of the generally cylindrical sleeve forming mandrels to which it is applied; and means for successively joining the overlapped ends of each of said blanks to one another at a third point of said second endless pattern that is away from said first point and said second point.

33. Apparatus according to claim 29 wherein said means for forming discs of a material that is sealable to said heat-sealable thermoplastic material and for applying said discs, in succession, to the ends of said generally cylindrical sleeves forming mandrels applies said discs to said ends of said generally cylindrical sleeve forming mandrels at said third point of said second endless patter.

34. Apparatus according to claim 30 wherein said means for forming discs of a material that is sealable to said heat-sealable material and for applying said discs, in succession, to the ends of said generally cylindrical sleeve forming mandrels comprises, in combination:

an unwind stand adjacent said plurality of generally cylindrical sleeve forming mandrels for supporting a coiled web of indefinite length of said material;

punch means located away from said unwind stand for receiving said coiled web from said unwind stand and for punching discs from said coiled web;

feed means cooperative with said punch means for feeding said coiled web through said punch means;

reciprocable disc transfer means adjacent said plurality of generally cylindrical sleeve forming mandrels for transferring said discs, in succession, to said generally cylindrical sleeve forming mandrels; and means for reciprocating said reciprocable disc transfer means.

* * * * *